(12) United States Patent
Nozaki et al.

(10) Patent No.: US 6,571,473 B1
(45) Date of Patent: Jun. 3, 2003

(54) METHOD AND SYSTEM FOR MANUFACTURING REFRIGERANT TUBES FOR CONDENSERS

(75) Inventors: Kimio Nozaki, Kanagawa (JP); Kazuhiro Asano, Tochigi (JP); Toru Okabe, Gunma (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/414,637

(22) Filed: Oct. 8, 1999

(51) Int. Cl.[7] ................................................ B23P 15/26
(52) U.S. Cl. .............................. 29/890.049; 29/890.053
(58) Field of Search ...................... 29/890.049, 890.053, 29/890.045, 505, 726, 727, 33 D, 33 G; 165/153

(56) References Cited

U.S. PATENT DOCUMENTS

| | | | |
|---|---|---|---|
| 4,486,933 A | 12/1984 | Iwase et al. ............. | 29/157.3 A |
| 4,562,630 A | * 1/1986 | Larsson ................. | 29/890.049 |
| 4,570,700 A | * 2/1986 | Ohara et al. ............. | 165/134.1 |
| 4,805,693 A | * 2/1989 | Flessate ...................... | 165/153 |
| 5,201,117 A | * 4/1993 | Wright ..................... | 29/890.05 |
| 5,456,006 A | 10/1995 | Study ..................... | 29/890.049 |
| 6,109,085 A | 8/2000 | Kikuchi et al. | |
| 6,276,513 B1 | 8/2001 | Asano et al. | |
| 6,315,158 B1 | 11/2001 | Yoshida et al. | |
| 6,418,614 B2 | 7/2002 | Akutsu et al. | |
| 6,423,423 B2 | 7/2002 | Akutsu et al. | |

FOREIGN PATENT DOCUMENTS

| | | |
|---|---|---|
| JP | 3-166023 | 7/1991 |
| JP | 3-199896 | 8/1991 |
| JP | 4-35831 | 3/1992 |
| JP | 4-113113 | 10/1992 |
| JP | 6-114455 | 4/1994 |
| JP | 9-85541 | 3/1997 |
| JP | 9-85542 | 3/1997 |
| JP | 11-70424 | 3/1999 |
| WO | 99/64805 | 12/1999 |

OTHER PUBLICATIONS

Yamauchi, Yoshiyuki, Journal of Nippondenso Technical Disclosure, "Heat Exchanger," Serial No. 33–126, Jan. 15, 1984.

* cited by examiner

Primary Examiner—I Cuda-Rosenbaum
(74) Attorney, Agent, or Firm—Foley & Lardner

(57) ABSTRACT

A method of manufacturing a refrigerant tube for a condenser includes forming an inner fin like a band plate having a predetermined length, forming a holder having a substantially V-shaped open section and a predetermined length, inserting the inner fin into the holder from a V-shaped opening of the holder, and pressing the holder to close the V-shaped opening and change the substantially V-shaped open section to a compressed closed section, whereby the inner fin is fixed in the holder.

5 Claims, 9 Drawing Sheets

METHOD AND SYSTEM FOR MANUFACTURING REFRIGERANT TUBES FOR CONDENSERS

BACKGROUND OF THE INVENTION

The present invention relates generally to a system for manufacturing heat exchangers for air conditioning systems, which includes a device for manufacturing cylindrical header pipes through press forming of plates, a device for manufacturing V-shaped holders through roll forming of band plates, a device for manufacturing tubes by inserting into the holders inner fins obtained through press forming or roll forming, a device for manufacturing corrugated outer fins through cutting of band plates by a corrugating cutter, and a device for superimposing the inner fins and the outer fins on each other and assembling thereto the header pipes. The present invention relates particularly to the above tubes manufacturing device in particular. The present invention relates more particularly to a method and a system for manufacturing refrigerant tubes for condensers for use, e.g. in an automotive refrigerating cycle.

A refrigerant tube for condensers for use in an automotive refrigerating cycle is compressedly formed out of a metallic material with small weight and excellent thermal conductivity such as aluminum or aluminum alloy. The refrigerant tube includes therein a band-plate-like inner fin made of the same metallic material to excellently refrigerate a gaseous refrigerant circulating in the tube.

When manufacturing the refrigerant tube with inner fin, first, a holder serving as an outer shell of the tube is formed to have a compressed closed section, and then the inner fin is inserted into the holder from an opening arranged at one end thereof.

With the known refrigerant tube, however, since the band-plate-like inner fin is inserted into the holder having the compressed closed section from the opening at one end thereof, a difficulty arises when inserting an end of the inner fin into the opening of the holder. Moreover, even if insertion of the end of the inner fin into the opening of the holder is performed smoothly, the inner fin may be caught and bent at some midpoint of the holder, resulting in considerably degraded insertion workability.

Further, along with degraded insertion workability, a long insertion stroke of the inner fin deteriorates a productivity of the refrigerant tube.

It is, therefore, an object of the present invention to provide a method and a system for manufacturing refrigerant tubes for condensers, which enable an improvement in manufacturing yield and in productivity.

SUMMARY OF THE INVENTION

One aspect of the present invention lies in providing a method of manufacturing a refrigerant tube for a condenser, comprising the steps of:
  forming an inner fin like a band plate having a predetermined length;
  forming a holder having a substantially V-shaped open section and a predetermined length;
  inserting said inner fin into said holder from a V-shaped opening of said holder; and
  pressing said holder to close said V-shaped opening and change said substantially V-shaped open section to a compressed closed section, whereby said inner fin is fixed in said holder.

Another aspect of the present invention lies in providing a system for manufacturing a refrigerant tube for a condenser, comprising:
  means for forming an inner fin like a band plate having a predetermined length;
  means for forming a holder having a substantially V-shaped open section and a predetermined length;
  means for horizontally transporting said inner fin held in a horizontal position in one direction;
  means for horizontally transporting said holder with a V-shaped opening turned upward in the same direction as that of said inner fin to be located under said inner fin;
  means for turning said inner fin from said horizontal position to a vertical position for insertion into said holder from said opening; and
  means for pressing said holder to close said V-shaped opening and change said substantially V-shaped open section to a compressed closed section, whereby said inner fin is fixed in said holder.

Still another aspect of the present invention lies in providing a system for manufacturing a refrigerant tube for a condenser, comprising:
  a first press forming machine forming an inner fin like a band plate having a predetermined length;
  a roll forming machine forming a holder having a substantially V-shaped open section and a predetermined length;
  a first conveyer connected to said first press forming machine, said first conveyer horizontally transporting said inner fin held in a horizontal position in one direction;
  a second conveyer connected to said roll forming machine, said second conveyer horizontally transporting said holder with a V-shaped opening turned upward in the same direction as that of said inner fin to be located under said inner fin;
  a turning unit arranged at a downstream end of said first conveyer, said turning unit turning said inner fin from said horizontal position to a vertical position for insertion into said holder from said opening; and
  a second press forming machine arranged adjacent to said second conveyer, said second press forming machine pressing said holder to close said V-shaped opening and change said substantially V-shaped open section to a compressed closed section, whereby said inner fin is fixed in said holder.

DETAILED DESCRIPTION OF THE INVENTION

Referring to the drawings, a description will be made with regard to a method and a system for manufacturing refrigerant tubes for condensers for use in an automotive refrigerating cycle embodying the present invention.

Figure 2:
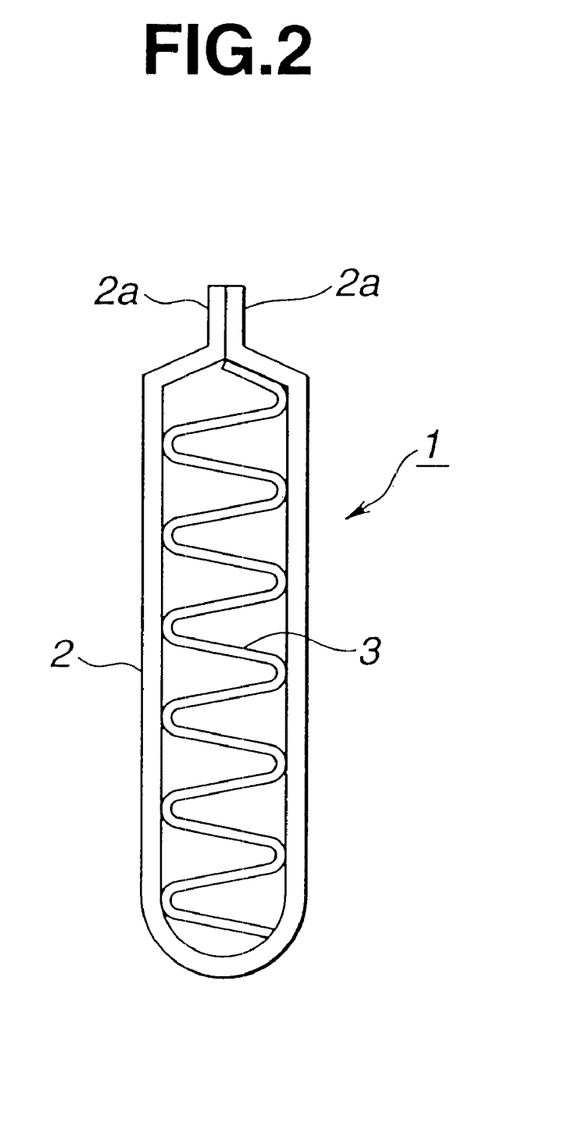
FIG. 2 is a sectional view showing a refrigerant tube obtained by the inventive method.

Referring to FIG. 2, a refrigerant tube 1 obtained by an inventive method comprises a holder 2 having a compressed closed section and serving as an outer shell of the tube 1, and a band-plate-like inner fin 3 inserted into and fixed in the holder 2. The holder 2 and the inner fin 3 are both made of a metallic material with small weight and excellent thermal conductivity such as aluminum or aluminum alloy.

The inner fin 3 is corrugated such that ranks of corrugation arranged longitudinally are adjacent to each other with half pitch shifted, for example, so as to maximize the contact area of a gaseous refrigerant circulating in the refrigerant tube 1, and thus raise the heat exchange performance.

Figure 1:
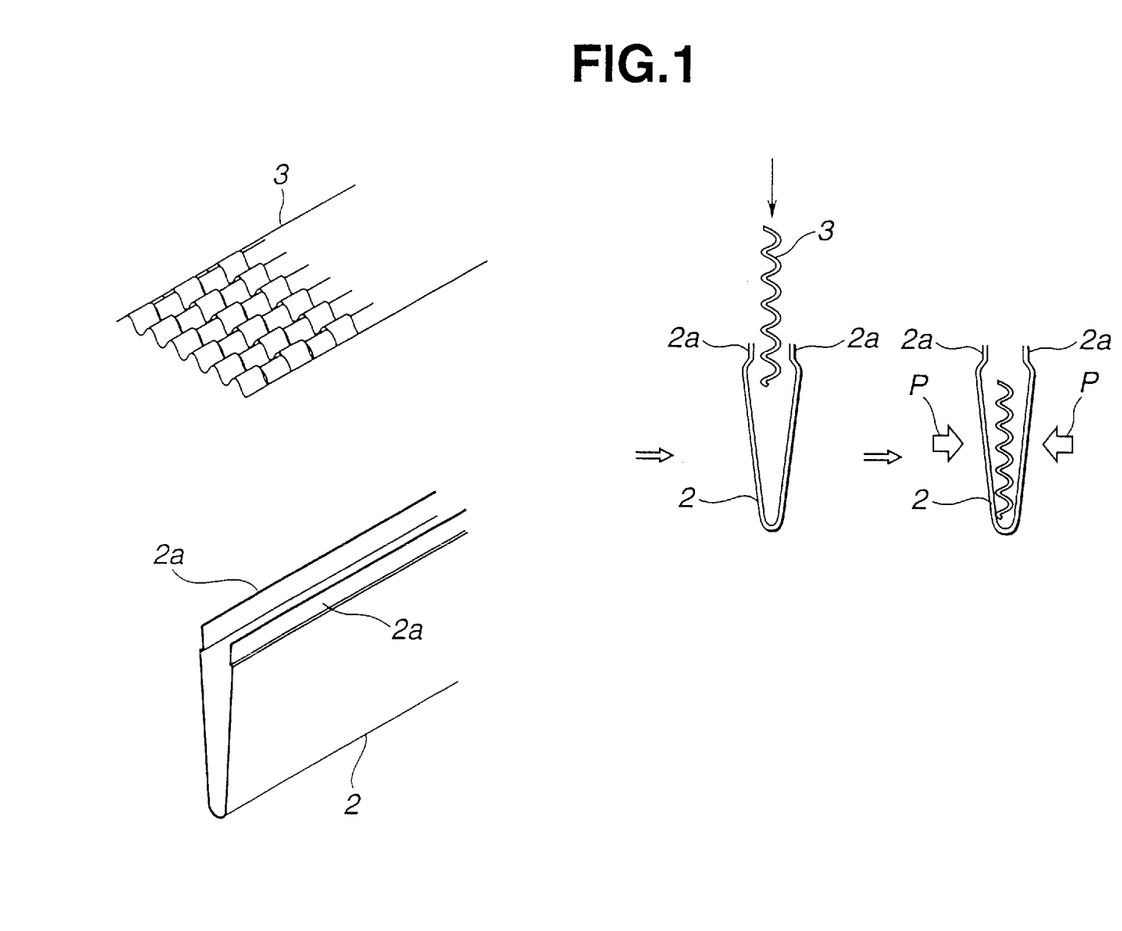
FIG. 1 is a schematic view showing a process of inserting an inner fin into a holder according to an inventive method.

Referring to FIG. 1, the refrigerant tube 1 is obtained as follows. First, the holder 2 is formed to have a substantially V-shaped section with flanges 2a arranged at both edges of an opening thereof, and the inner fin 3 is formed like a band plate with corrugated section. Then, the inner fin 3 is inserted into the holder 2 from the opening, which is subjected to an external force P from both sides thereof so as to change the substantially V-shaped open section to a compressed closed section. And the flanges 2a are caulked to close the opening of the holder 2, holding and fixing the inner fin 2 in the holder 2.

The above processes will be described in detail.

Inner-fin Forming Process

The inner fin 3 can be formed by press working of a sheet of metallic plate material, which allows obtainment of a plurality of band-plate-like works. However, in view of the material yield and the productivity, the inner fin 3 is formed, preferably, by continuous press working wherein a rolled metallic plate material with a predetermined width is cut successively from a leading end thereof to have a predetermined length, and is corrugated simultaneously.

Thus, when continuously forming a rolled metallic plate material with a predetermined width into the band-plate like inner fin 3 with a predetermined width, the width of the metallic plate material corresponds to the length of the inner fin 3. The holder 2 is formed in conformity with the length of the inner fin 3.

Holder Forming Process

The holder 2 is formed out of a rolled metallic plate material with a predetermined width by using a roll forming machine to have a substantially V-shaped section with the flanges 2a arranged at the edges of the opening, and is cut in conformity with the length of the inner fin 3.

Inner-fin Inserting Process

In the inner-fin inserting process, the inner fin 3 formed in the inner-fin forming process are inserted into the holder 2 formed in the holder forming process from the opening thereof, with the inner fin 3 and the holder 2 being in parallel to each other.

As for the position of the inner fin 3 and the holder 2 upon assembly, the inner fin 3 can horizontally be inserted into the holder 2 disposed horizontally. However, in view of the insertability and the productivity of the inner fin 3, the holder 2 is disposed, preferably, vertically to have the opening turned upward so as to allow vertical insertion of the inner fin 3. In that case, the inner fin 3 is dropped in the opening of the holder 2 by its own weight, enabling sure and easy insertion of the inner fin 3 into the holder 2.

In order to ensure continuous insertion of the inner fin 3 into the holder 2 with advantage in terms of production, the following method is adopted. The inner fins 3 held in the horizontal position upon forming by continuous press working are continuously horizontally transported in one direction. And the holders 2 with the openings turned upward are continuously horizontally transported in the same direction as that of the inner fins 3 to be located under the inner fins 3. The inner fins 3 are successively turned vertically, and are dropped in the openings of the holders 2 for insertion.

In that case, the inner fin 3 and the holder 2, each disposed long sideways, are transported in one direction to obtain shortened transport stroke.

Holder Press-forming Process

The holder 2 having the inner fin 3 inserted therein in the inner-fin inserting process is subjected to a predetermined pressure P of a press forming machine from both sides thereof so as to change the substantially V-shaped open section to the compressed closed section. And the flanges 2a are caulked to hold and fix firmly the inner fin 2 in the holder 2.

In this embodiment, the holder 2 is formed to have a substantially V-shaped section, and the inner fin 3 is inserted into the holder 2 from the V-shaped opening. Thus, not only the inner fin 3 can easily be inserted into the holder 2 without being caught and bent therein, but an insertion stroke of the inner fin 3 can extremely be shortened to the width thereof. Moreover, the holder 2 having the inner fin 3 inserted therein is subjected to press forming so as to change the substantially V-shaped open section to the compressed closed section. And the opening of the holder 2 is pressed and closed to hold and fix appropriately the inner fin 2 in the holder 2. Thus, the refrigerant tube 1 can be manufactured with excellent yield and shortened manufacturing time, resulting in enhanced productivity.

Particularly, the inner fins 3, held in the horizontal position, are continuously horizontally transported in one direction, whereas the holders 2 with the opening turned upward are continuously horizontally transported in the same direction as that of the inner fins 3 to be located under the inner fins 3. The inner fins 3 are successively turned vertically, and are dropped in the openings of the holders 2 for insertion. Adoption of this method enables a continuous insertion of the inner fins 3, resulting in enhanced working efficiency.

In that case, the inner fin 3 and the holder 2 are transported, each being disposed long sideways so that the longitudinal direction is perpendicular to the transport direction. This enables a more efficient continuous insertion of the inner fins 3 into the holders 2 at a short transport stroke, resulting in further enhanced working efficiency.

Figure 3:
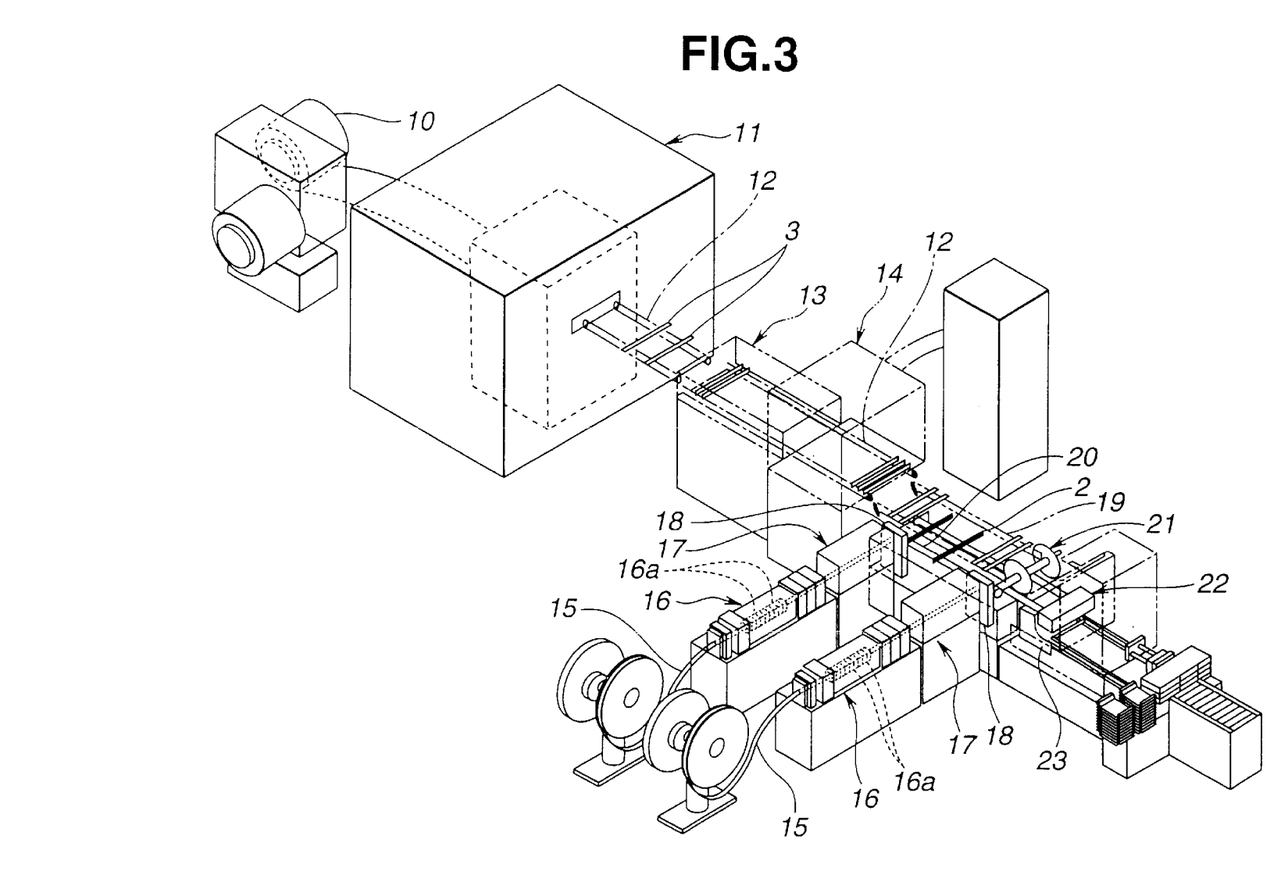
FIG. 3 is a perspective view showing a system for implementing the inventive method.

Referring to FIG. 3, an example of a system will be described, which implements the above method advantageously in terms of production.

A rolled metallic plate material 10 with a predetermined width is fed from a leading end thereof to a press forming machine or inner-fin forming means 11.

The press forming machine 11 performs fin forming wherein continuous cutting of the metallic plate material 10 at a predetermined length and corrugation thereof are ensured simultaneously or stepwise.

The band-plate-like inner fin 3 formed by the press forming machine 11 is carried to a dryer 13 though a chain conveyer 12, wherein oil on the surface of the inner fin 3 is dried and removed.

The inner fin 3 dried by the dryer 13 is carried to a flux chamber 14 wherein powdery flux is applied to all the surface of the inner fin 3.

Application of powdery flux to the surface of the inner fin 3 is performed so that when the refrigerant tube 1 is assembled to a header pipe, not shown, and then is subjected to welding processing in a heating furnace in the final process, excellent welding is achieved between the inner fin 3 and the inner surface of the holder 2.

When applying powdery flux, the inner fin 3 is disposed, preferably, vertically to allow uniform application of powdery flux on both side faces thereof. On that account, referring to FIG. 4, the chain conveyer 12 is of the type including fork-like holding members arranged on chains on both sides thereof and at regular intervals and for successively receiving and vertically holding the inner fins 3 carried out in the horizontal position from the press forming machine 11.

The inner-fin forming process includes a series of working processes from press forming of the inner fin 3 by the press forming machine 11 to drying processing by the dryer 13 and powdery-flux applying processing in the flux chamber 14.

In the holder forming process, a rolled metallic plate material 15 with a predetermined width is fed from a leading end thereof to a roll forming machine or holder forming means 16.

The roll forming machine 16 performs roll forming of the metallic plate material 15 multi-stepwise by a forming roll 16a to obtain the substantially V-shaped section, which is carried to a dryer 17 arranged downstream of the roll forming machine 16 so as to dry and remove oil on the surface of the metallic plate material 15.

A continuous work with substantially V-shaped section subjected to drying processing by the dryer 17 is carried to a cutter 18 wherein it is cut in conformity with the length of the inner fin 3, obtaining the holder 2 with a predetermined length and a substantially V-shaped section.

The holder forming process includes a series of working processes from roll forming of the metallic plate material 15 by the roll forming machine 16 to drying processing by the dryer 17 and cutting by the cutter 18.

In this embodiment, the inner-fin inserting process can continuously be performed in the inner-fin forming process downstream of flow of the inner fin 3. On that account, two conveyers are arranged downstream of the chain conveyer 12: a conveyer or inner-fin transporting means 19 for successively receiving the inner fins 3 transported in the vertical position by the chain conveyer 12 and horizontally transporting them in the horizontal position, and a conveyer or holder transporting means 20 arranged under the conveyer 19 and for horizontally transporting the holders 2 obtained in the holder forming process and with the openings turned upward and in the horizontal position in the same way as the inner fins 3. Thus, an inner-fin forming line and an inner-fin inserting line are disposed linearly.

Specifically, at the inner-fin inserting line, a turning unit or inner-fin inserting means 21 is arranged at a downstream end of the conveyer 19. The turning unit 21 turns the inner fin 3 horizontally transported by the conveyer 19 from the horizontal position to the vertical position, which is dropped in the opening of the holder 2 transported by the conveyer 20 for insertion.

The holder 2 having the inner fin 3 inserted therein at the inner-fin inserting line is carried to a press forming machine or press forming means 22 arranged downstream of the inner-fin inserting line, wherein it is pressed from both sides thereof so as to change the substantially V-shaped open section to the compressed closed section. And the flanges 2a are caulked as described above, obtaining the refrigerant tube 1 having the inner fin 3 held and fixed in the holder 2. The refrigerant tube 1 is carried out by a shooter 23 disposed under the press forming machine 22.

Figure 4:
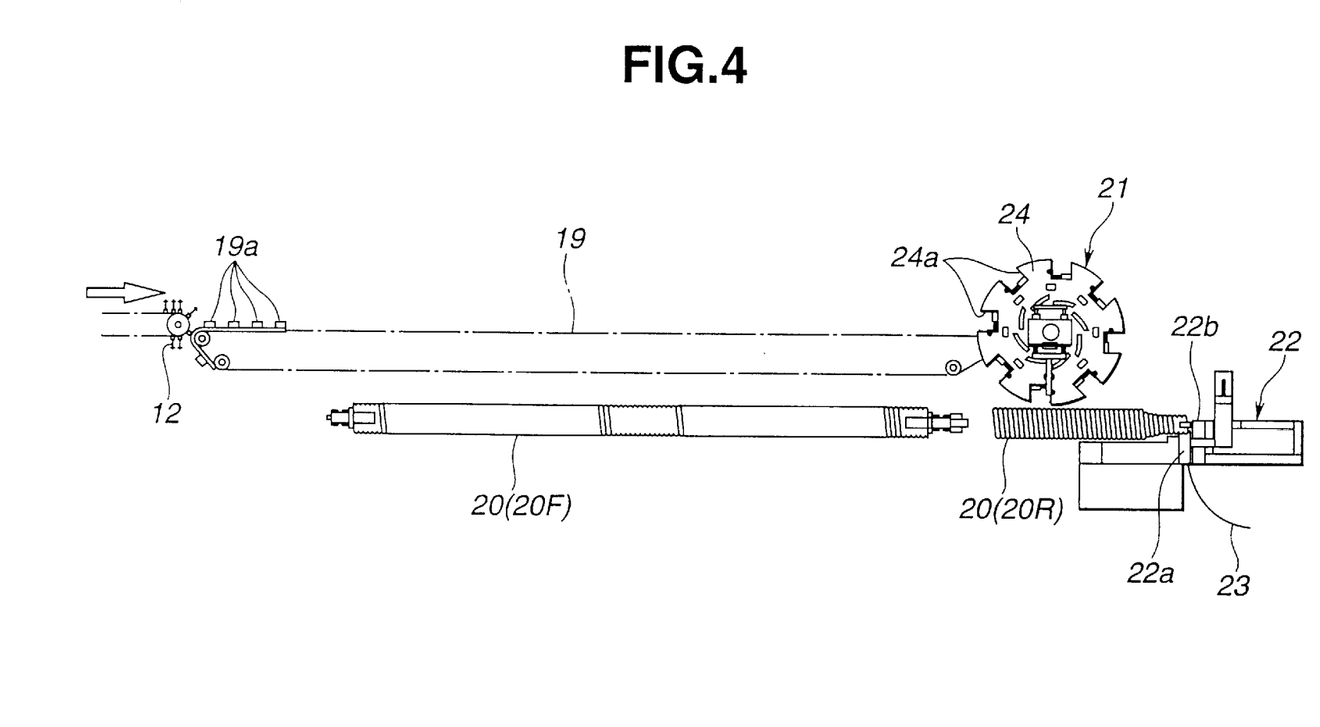
FIG. 4 is a schematic side view of the system.

Implementation of continuous insertion of the inner fins 3 into the holders 2 at the inner-fin inserting line needs to synchronously transport the inner fins 3 and the holders 2 at regular pitches. Referring to FIG. 4, the conveyer 19 for transporting the inner fins 3 includes, e.g. a chain conveyer including holding members 19a arranged on the chains on both sides thereof and at predetermined intervals each slightly wider than the inner fin 3 and for enabling transport of the inner fins 3 disposed long sideways and over the chains and held between the holding members 19a at regular intervals.

Figure 6:
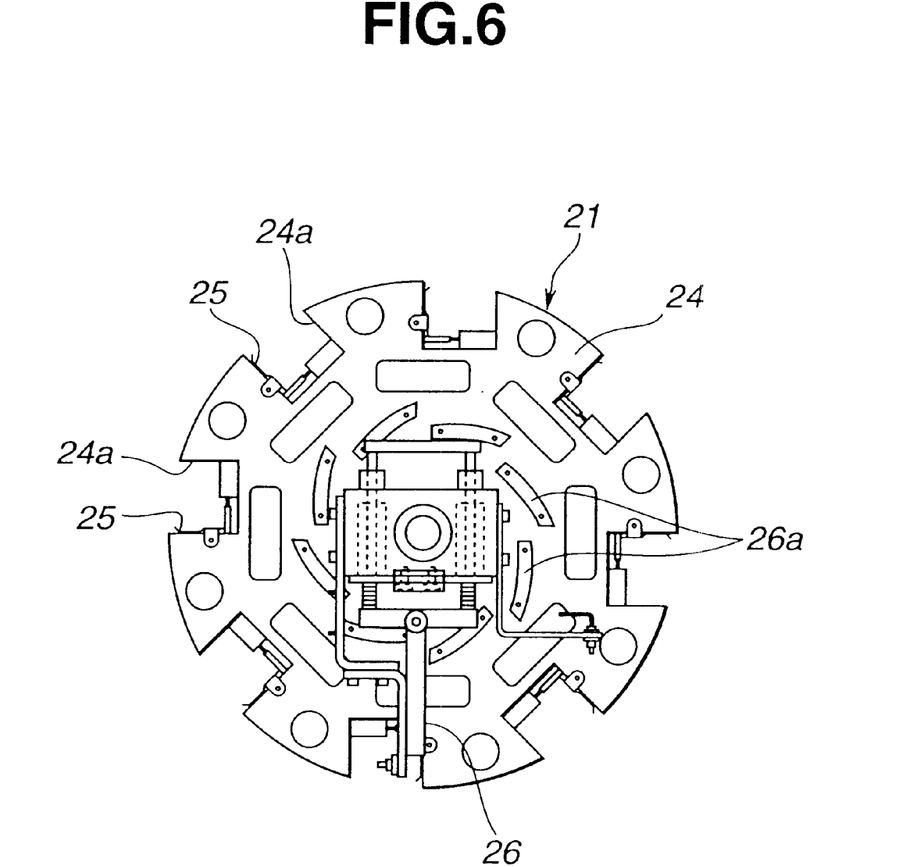
FIG. 6 is a side view showing a turning unit including a rotary disk.

Referring to FIG. 6, the turning unit 21 arranged at the downstream end of the chain conveyer 19 includes, e.g. a pair of rotary disks 24 having grooves 24a formed equidistantly at the periphery thereof, each providing a plate spring 25 arranged on the side face thereof for clipping the inner fin 3 inserted therein.

The rotary disks 24 are disposed in a space defined by the chains of the conveyer 19, and are rotated in the same direction and feed speed as those of the conveyer 19. The holding member 19a horizontally delivers the inner fin 3 to the rotary disks 24 at the downstream end of the conveyer 19. When the rotary disk 24 is rotated 270° from the position where the inner fin 3 is inserted into a space defined by the plate spring 25 so as to obtain the inner fin 3 vertically disposed, a push rod 26 arranged at a bearing and driven intermittently by a cam 26a pushes the inner fin 3 downward.

Figure 5:
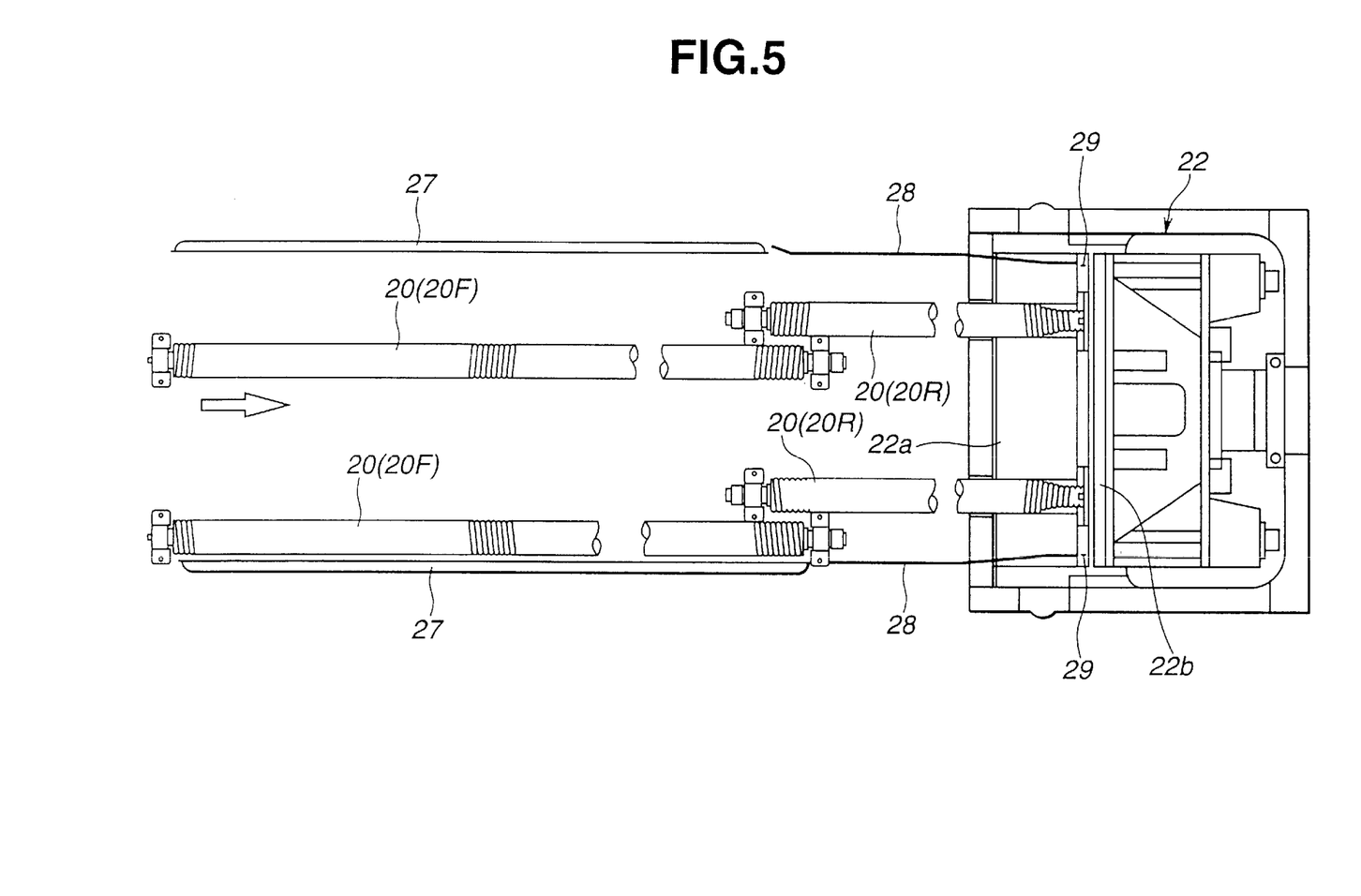
FIG. 5 is a schematic fragmentary plan view of the system.

Referring to FIGS. 4–5, the conveyer 20 for transporting the holders 2 includes, e.g. a pair of screw conveyers that can hold in respective thread grooves the holder 2 with the opening turned upward and in the long sideways state. The conveyer 20 can transport the holders 2 at the same feed speed as that of the inner fins 3.

In this embodiment, in order to continuously supply the holders 2 to the conveyer 20, two holder forming lines covering from the roll forming machine 16 to the cutter 18 are disposed perpendicularly to the conveyer 20. Those holder forming lines allow continuous supply of the holders 2 with the openings turned upward to the conveyer 20 in accordance with a transport pitch of the inner fins 3.

The conveyer 20 includes two stages, i.e. a front-stage transport part 20F disposed in a portion where the holders 2 are supplied from the holder forming line and a rear-stage transport part 20R disposed in a portion where the holders 2 having the inner fins 3 inserted therein by the turning unit 21 are carried to the press forming machine 22. Transport guides 27, 28 are arranged on both sides of the transport parts 20F, 20R to prevent the holders 2 from transversely deviating from the conveyer 20.

A rear end of the rear-stage transport part 20R is formed like a taper with gradually decreasing diameter, and is supported on a stationary die 22a of the press forming machine 22. The transport guides 28 are gradually transversely decreased in the rear portion to correspond to the length of the holder 2, and provide at a rear end plate springs 29 for lightly transversely holding the holder 2. Thus, the holders 2 coming rearward are lightly held by the plate springs 29, and are successively dropped between the stationary die 22a and a movable die 22b of the press forming machine 22.

Therefore, in this embodiment, the inner fins 3, each carried out after being subjected to press forming by the press forming machine 11 at the inner-fin forming line and to powdery-flux applying processing in the flux chamber 14, are removed to the conveyer 19 at the inner-fin inserting line, and are horizontally transported in the long sideways state and in the horizontal position.

The holders 2, each subjected to roll forming into a substantially V-shaped section and cut to a predetermined length, are successively horizontally transported with the openings turned upward and in the long sideways state by the conveyer 20 arranged under the conveyer 19.

At the downstream end of the conveyer 19, the turning unit 21 turns the inner fin 3 to the vertical position, which is dropped in the holder 2 from above for insertion.

Therefore, the inner fin 3 can easily be inserted into the holder 2 without being caught and bent therein.

The holder 2 is subjected to press forming by the press forming machine 22 arranged downstream thereof so as to change the substantially V-shaped open section to the compressed closed section. This enables continuous manufacture of the refrigerant tubes 1, obtaining improved manufacturing yield and reduced manufacturing time of the refrigerant tubes 1, resulting in further enhanced productivity.

Further, at the inner-fin inserting line, the inner fin 3 and the holder 2 are both transported in the long sideways state, enabling a more efficient continuous insertion of the inner fins 3 into the holder 22 at a short transport stroke, resulting in further enhanced working efficiency.

Still further, the inner-fin forming line and the inner-fin inserting line are disposed linearly, and particularly, there arrange vertically and in the multi-stage way the conveyer or inner-fin transporting means 19 and the conveyer or holder transporting means 20, enabling shortened manufacturing line, resulting in minimized system space.

Furthermore, the inner fin 3 is held by the holding members 19a of the conveyer 19 for transport, whereas the holder 2 is held in the thread grooves of the conveyer 20 for transport. Thus, a transport timing of the inner fin 3 with respect to the holder 2 is easily provided, enabling synchronous adjustment of an insertion timing of the inner fin 3 into the holder 2 by rotational adjustment of the conveyer 20, resulting in simplified structure of the transporting means.

Referring to FIGS. 7–10, the inventive turning unit will be described in detail.

Figure 7:
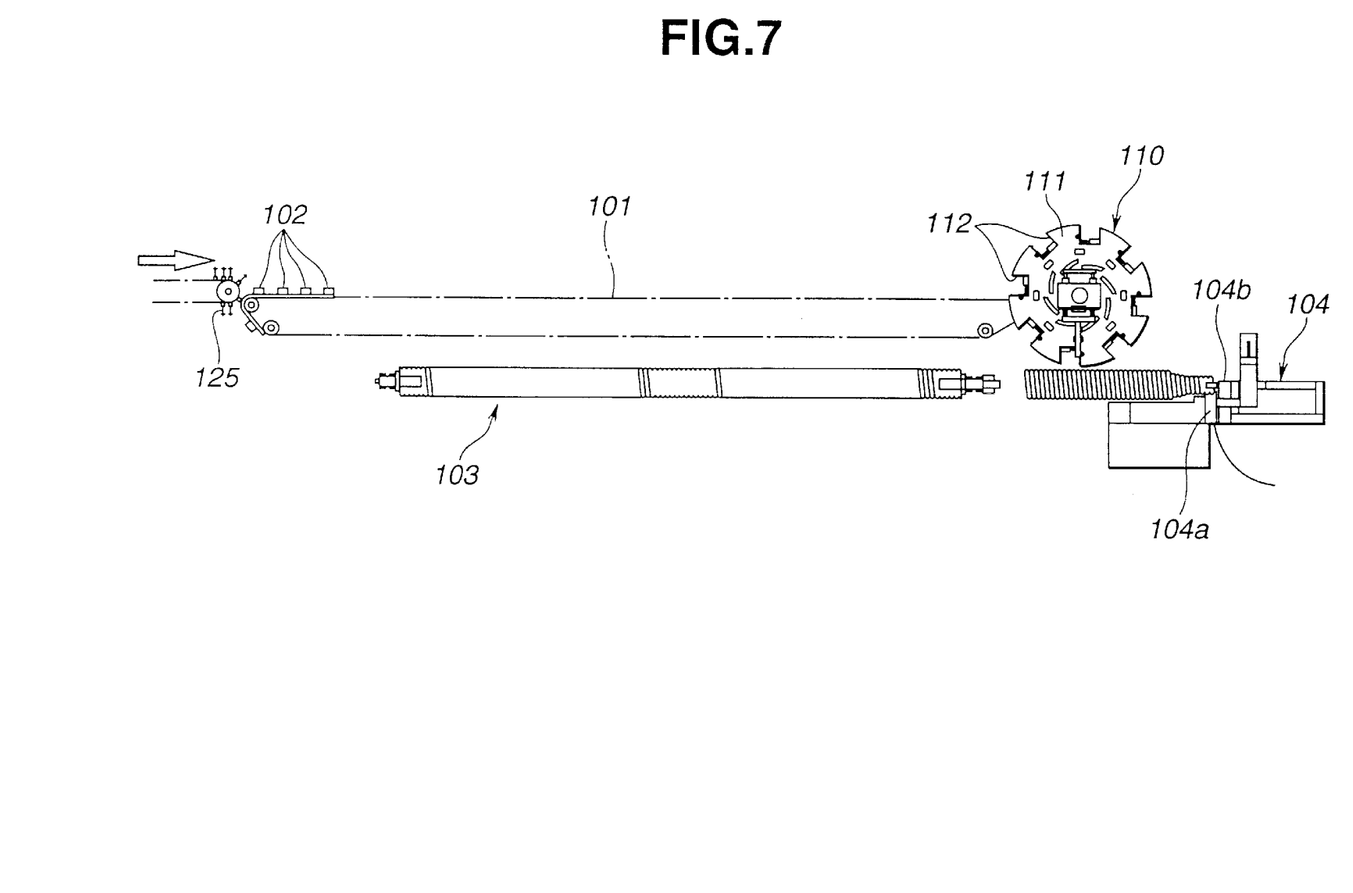
FIG. 7 is a view similar to FIG. 4, showing the turning unit applied to a manufacturing line of the refrigerant tube.

Referring to FIG. 7, the turning unit is applied to a manufacturing line of a refrigerant tube for condensers for use in an automotive refrigerating cycle.

A chain conveyer or first conveyer 101 includes holding members 102 arranged on right and left chains at regular intervals and for horizontally transporting inner fins 107 (see FIG. 10) disposed long sideways and over the chains and in the horizontal position and held between holding members 102.

A screw conveyer or second conveyer 103 is arranged under the chain conveyer 101 to transport holders 106 (see FIG. 10) with substantially V-shaped sections and openings turned upward and in the horizontal position in the same way as the inner fins 107.

Figure 8:
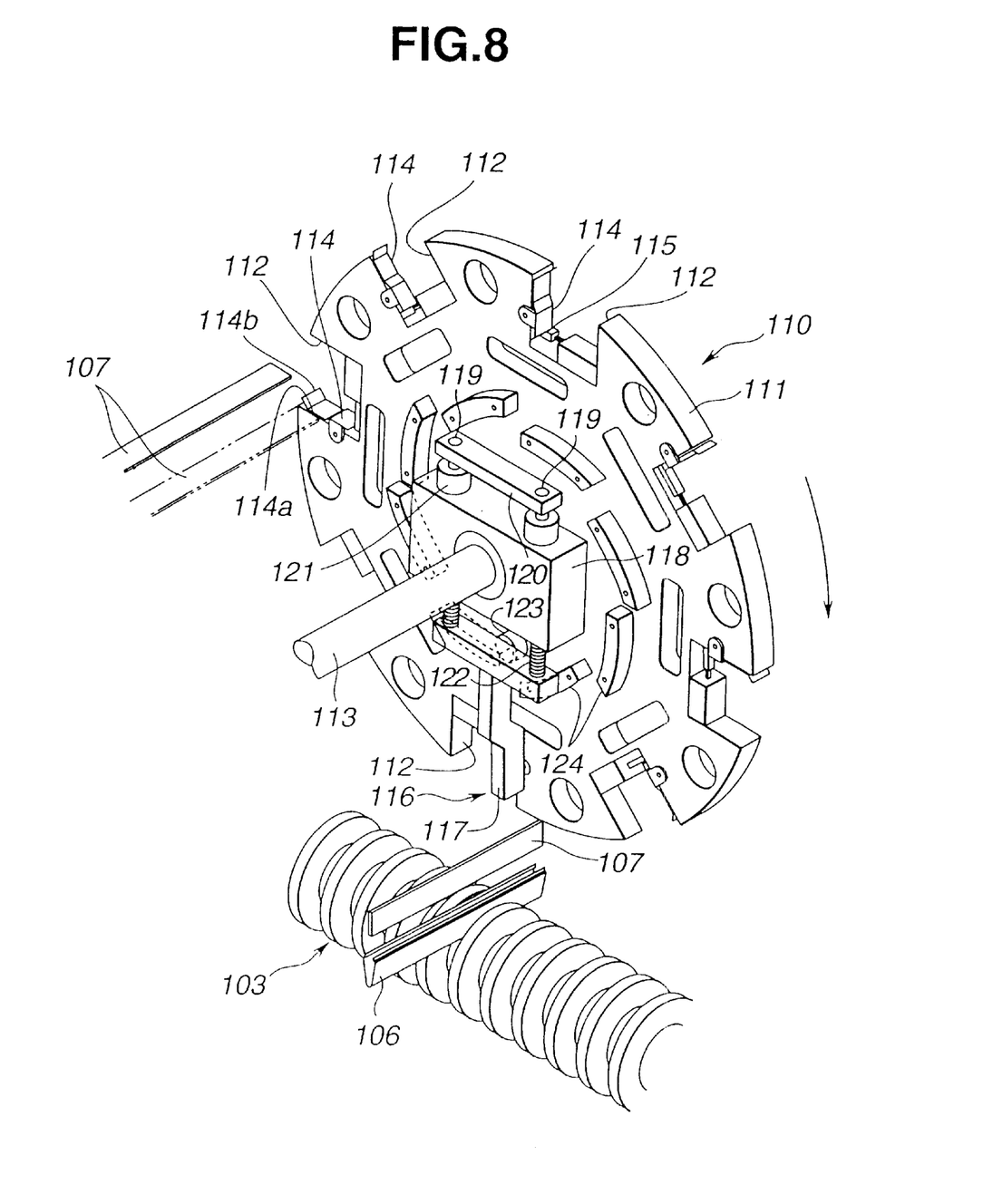
FIG. 8 is a view similar to FIG. 3, showing the rotary disk.
Figure 10:
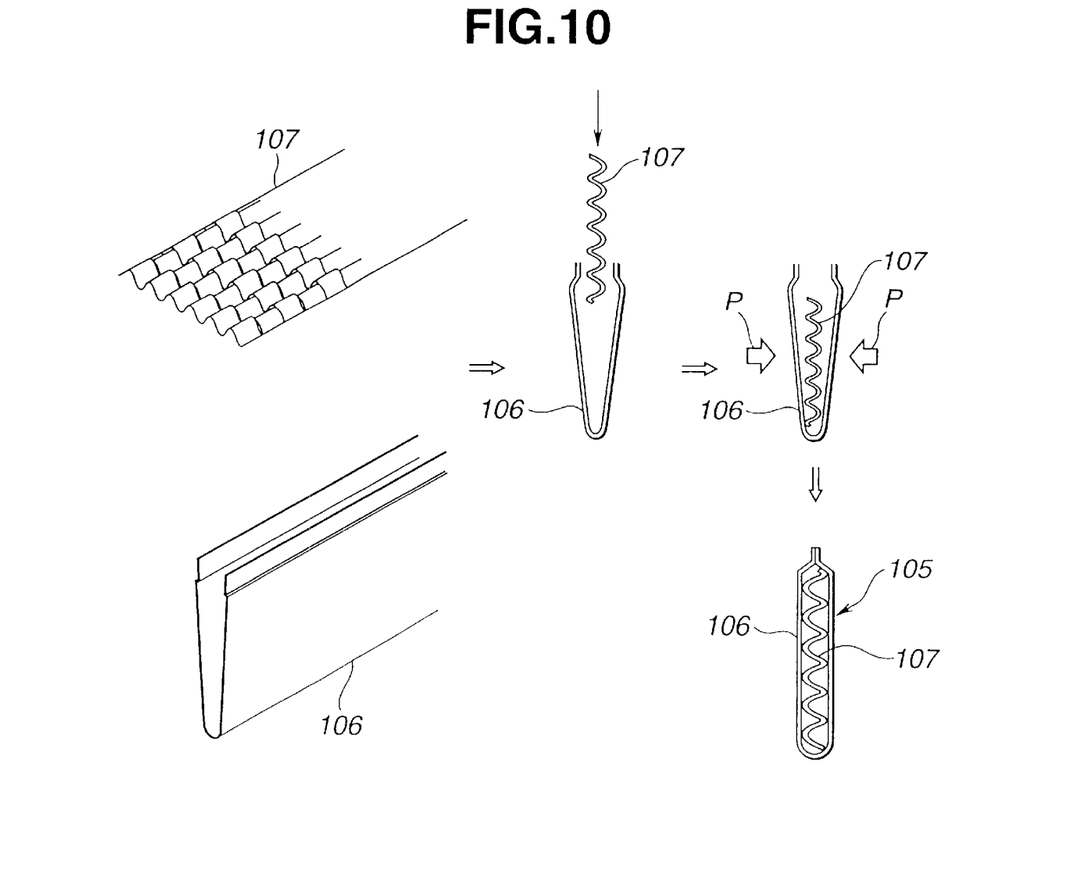
FIG. 10 is a view similar to FIG. 1, showing a process of manufacturing the refrigerant tube.

Referring also to FIGS. 8 and 10, at a downstream end of the chain conveyer 101, a turning unit 110 turns the inner fin 107 from the horizontal position to the vertical position, which is dropped in the opening of the holder 106 transported by the screw conveyer 103 for insertion. Held between a stationary die 104a and a movable die 104b of a press forming machine 104 arranged at a downstream end of the screw conveyer 103, the inner fin 107 is subjected to an external force P from both sides thereof so as to change the substantially V-shaped open section to a compressed closed section. And the opening of the holder 106 is pressed and closed to hold and fix the inner fin 107 in the holder 106, obtaining a refrigerant tube 105.

Referring to FIG. 8, the turning unit 110 includes a pair of rotary disks 111 arranged at the downstream end of the chain conveyer 101 and rotated by a rotation shaft 113 in the same direction as that of the chain conveyer 101.

The rotary disks 111 are spaced smaller than the chains of the chain conveyer 101, and are thus slightly engagedly disposed between rear ends of the chains. Each rotary disk 111 has grooves 112 formed equidistantly at the periphery thereof and for receiving the inner fins 107 through the holding members 102 of the chain conveyer 101.

Figure 9:
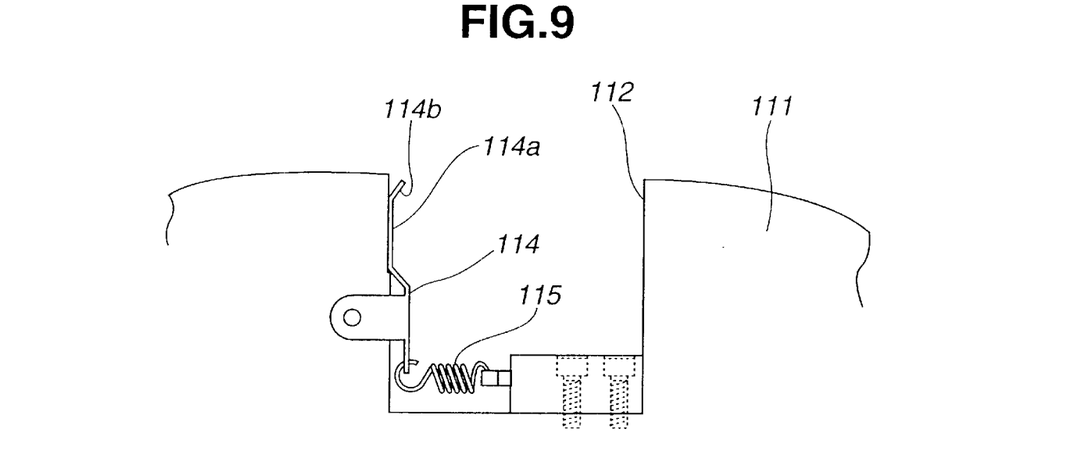
FIG. 9 is an enlarged fragmentary side view showing a groove having a plate spring.

Referring also to FIG. 9, each groove 112 has a side face on the leading side as viewed in the direction of rotation, which is formed to substantially correspond to an elongation of the transport surface of the chain conveyer 101. A plate spring or clipping means 114 is mounted to the side face of the groove 112 so as to hold the inner fin 107 thereon.

The plate spring 114 has a rear end drawn by a coil spring 115 to have a holding face 114a contacting the groove side face, and a front end bent upward with respect to the groove side face to form an inclined edge 114b for guiding the inner fin 107 to be inserted between the holding face 114a and the groove side face.

The turning unit 110 includes a push rod unit 116. The holding member 102 horizontally delivers the inner fin 107 to the rotary disks 111 at the downstream end of the chain conveyer 101. When the rotary disk 111 is rotated 270° from the position where the inner fin 107 is inserted into a space defined by the plate spring 114 so as to obtain the inner fin 107 vertically disposed, the push rod unit 116 pushes downward the inner fin 107 held on the groove side face by the plate spring 114 for insertion into the opening of the holder 106.

A push rod 117 of the push rod unit 116 has a T-shaped side face, and is fixed at a lower end of a pair of slide stays 119 arranged vertically through a bearing 118 of the rotation shaft 113 of the rotary disk 111.

Each slide stay 119 has an upper end fixed to a connecting bar 120, a downward limit position of which is restricted by the connecting bar 120 and a stopper 121 arranged on the upper side of the bearing 118. Coil springs or biasing means 122 are arranged between the lower side of the bearing 118 and the upper side of the push rod 117 and around shafts of the slide stays 119 to move the push rod 117 downward.

A roller or cam follower 123 is rotatably mounted to the push rod 117 on the side face in the middle of an upper end thereof facing the rotary disk 111. Cams 124 are arranged on the outer side face of the rotary disk 111 to move the push rod 117 upward, each coming in slide contact with the roller 123 with rotation of the rotary disk 111 after the push rod 117 drops the inner fin 107 by force of the coil spring 122.

In this embodiment, the cams 124 correspond in number to the grooves 112, and are equidistantly disposed about the rotation center of the rotary disk 111. Each cam 124 is circularly formed so that a distance between a front end or leading end thereof as viewed in the direction of rotation of the rotary disk 111 and the center of rotation of the rotary disk 111 is greater than a distance between a rear end or trailing end thereof as viewed in the direction of rotation of the rotary disk 111. Thus, the roller 123 comes in slide contact with the inner peripheral surface of the cam 124.

Specifically, when the roller 123 disengages from the rear end of the cam 124, the push rod 117 is urged to move downward by force of the coil spring 122 to drop the inner fin 107. And the roller 123 engages with the front end of the subsequent cam 124 to slide thereon with rotation of the rotary disk 111, moving the push rod 117 upward against a force of the coil spring 122. In such a way, the cams 124 repeatedly ensure downward and upward movements of the push rod 117.

Next, the operation of the turning unit 110 will be described in detail.

The inner fins 107 formed in the inner-fin forming process, not shown, are transported by a chain conveyer 125 in the direction of arrow in FIG. 7, and are successively received by the holding members 102 arranged on the subsequent chain conveyer 101 for transport to the turning unit 110.

The holders 106 with the substantially V-shaped sections formed in the holder forming process, not shown, are successively supplied, with the openings turned upward, to the screw conveyer 103, which are transported under the turning unit 110.

A transport pitch and a feed speed of the inner fins 107 by the chain conveyer 101 are equal to those of the holders 106 by the screw conveyer 103. In conformity with those transport pitch and feed speed, a rotational speed of the rotary disks 111 of the turning unit 110 is synchronously adjusted to provide an insertion timing of the inner fin 107 into the opening of the holder 106.

When transported to the turning unit 110 by the chain conveyer 101 and horizontally delivered to the rotary disk 111 by the holding member 102 at the downstream end of the conveyer 101, the inner fin 107 enters the groove 112 of the rotary disk 111.

At that time, since the side face of the groove 112 on the leading side substantially corresponds to an elongation of the transport surface of the chain conveyer 101, the inner fin 107 is urged to slide on the groove side face, and is guided by the inclined edge 114*b* of the plate spring 114 for insertion between the holding face 114*a* and the groove side face.

When the rotary disk 111 is rotated 270° from the position where the inner fin 107 is horizontally delivered to the rotary disk 111 by the holding member 102 and is inserted into a space defined by the plate spring 114 so as to obtain the inner fin 107 vertically disposed, the roller 123 of the push rod unit 116 is disengaged from the rear end of the cam 124 that has been engaged therewith, and the push rod 117 is urged to move downward by force of the coil spring 122. This drops the inner fin 107 held by the plate spring 114, which is inserted into the opening of the holder 106 passing under the rotary disk 111, achieving continuous insertion and assembly of the inner fins 107 into the holders 106.

As described above, as being held by the plate spring 114 on the side face of the groove 112 of the rotary disk 111, the inner fin 107 fails to disengage from the groove 112 during rotational transport. This prevents occurrence of a damage of the inner fin 107 or a failure of the turning unit 110 due to disengagement of the inner fin 107.

Further, since the inner fin 107 is held and rotationally transported by a pair of rotary disks 111, the rotary disks 111 can be arranged with a space therebetween appropriately reduced, enabling a reduction in size of the system.

Still further, the side face of the groove 112 of the rotary disk 111 on the leading side is formed to substantially correspond to an elongation of the transport surface of the chain conveyer 101. Thus, a delivery of the inner fin 107 is ensured smoothly from the chain conveyer 101 to the groove side face, and the inner fin 107 is surely received from on the chain conveyer 101 for holding on the groove side face by the plate spring 114, resulting in smooth catch of the inner fin 107.

Furthermore, the clipping means for the inner fin 107 include the plate spring 114, which enables simplified structure. Moreover, the front end of the plat spring 114 includes the inclined edge 114*b* to guide the inner fin 107 to be inserted between the holding face 114*a* and the side face of the groove 112, enabling more smooth catch of the inner fin 107.

Further, the push rod unit 116 actuates the push rod 117 to move downward by surely providing a timing by the cam 124, the roller 123, and the coil spring 122, enabling simplified structure of the push rod unit 116.

Having described the present invention with regard to the preferred embodiment, it is noted that the present invention is not limited thereto, and various changes and modifications can be made without departing from the scope of the present invention.

What is claimed is:

1. A method of manufacturing a refrigerant tube for a condenser, comprising the steps of:

cutting a first plate material having a predetermined width into an inner fin having a predetermined length, wherein said predetermined width of said first plate material corresponds to said predetermined length of said inner fin;

cutting a second plate material having a predetermined width to form a holder having a substantially V-shaped open section and a predetermined length, wherein said predetermined length of said holder corresponds to said predetermined length of said inner fin;

inserting said inner fin into said holder from a V-shaped opening of said holder by using the weight of said inner fin; and using pressing said holder to close said V-shaped opening and change said substantially V-shaped open section to a compressed closed section, whereby said inner fin is fixed in said holder.

2. A method as claimed in claim 1, wherein said inserting step includes:

horizontally transporting said inner fin held in a horizontal position in one direction;

horizontally transporting said holder with said opening turned upward in the same direction as that of said inner fin to be located under said inner fin; and turning said inner fin from said horizontal position to a vertical position for insertion into said holder.

3. A method as claimed in claim 2 herein said inner fin and said holder are transported in a long sideways state.

4. A method of manufacturing a refrigerant tube of a predetermined length for a condenser, comprising the steps of:

forming an inner fin having a predetermined length by cutting a first plate material, wherein said predetermined length of said inner fin corresponds to said predetermined length of said refrigerant tube;

cutting a second plate material and bending said cut second plate material to form a substantially V-shaped open section of a predetermined length, wherein said predetermined length of said holder corresponds to said predetermined length of said inner fin;

inserting said inner fin into said holder from a V-shaped opening of said holder by using the weight of said inner fin; and     pressing said holder to close said V-shaped opening and to compress said holder against said inner fin whereby said inner fin is fixed in said holder.

5. The method of claim 4, wherein said step of forming said inner fin further comprises corrugating said inner fin simultaneously with cutting said first plate material.

* * * * *